(12) United States Patent
Kamino et al.

(10) Patent No.: US 8,801,547 B2
(45) Date of Patent: Aug. 12, 2014

(54) METHOD FOR SELECTING GOLF CLUB

(75) Inventors: Kazuya Kamino, Kobe (JP); Keiji Moriyama, Kobe (JP)

(73) Assignee: SRI Sports Limited, Kobe (JP)

( * ) Notice: Subject to any disclaimer, the term of this patent is extended or adjusted under 35 U.S.C. 154(b) by 297 days.

(21) Appl. No.: 13/236,834

(22) Filed: Sep. 20, 2011

(65) Prior Publication Data

US 2012/0108353 A1   May 3, 2012

(30) Foreign Application Priority Data

Nov. 2, 2010   (JP) .................................. 2010-245881

(51) Int. Cl.
 *A63B 53/00*   (2006.01)
(52) U.S. Cl.
 USPC ........................................................ 473/409
(58) Field of Classification Search
 USPC ........................................................ 473/409
 See application file for complete search history.

(56) References Cited

U.S. PATENT DOCUMENTS

| | | | | |
|---|---|---|---|---|
| 5,755,624 A * | 5/1998 | Helmstetter | ................... | 473/291 |
| 6,231,457 B1 * | 5/2001 | Chen | ............................ | 473/319 |
| 6,319,147 B1 * | 11/2001 | Nakamura et al. | ............. | 473/287 |
| 6,719,648 B1 * | 4/2004 | Smith | ........................... | 473/409 |
| 6,758,759 B2 * | 7/2004 | Gobush et al. | ................. | 473/131 |
| 6,890,269 B2 * | 5/2005 | Burrows | ........................ | 473/307 |
| 7,147,570 B2 * | 12/2006 | Toulon et al. | .................. | 473/290 |
| 7,153,215 B2 * | 12/2006 | Peterson et al. | ............... | 473/199 |
| 7,297,070 B2 * | 11/2007 | Ashida et al. | .................. | 473/223 |
| 7,621,828 B2 * | 11/2009 | Voges et al. | .................... | 473/409 |
| 8,342,980 B2 * | 1/2013 | Jertson | ........................... | 473/291 |
| 2009/0088275 A1 | 4/2009 | Solheim et al. | | |
| 2009/0088276 A1 | 4/2009 | Solheim et al. | | |
| 2009/0131189 A1 | 5/2009 | Swartz et al. | | |
| 2009/0131193 A1 * | 5/2009 | Swartz et al. | ................. | 473/289 |
| 2010/0151956 A1 | 6/2010 | Swartz et al. | | |

FOREIGN PATENT DOCUMENTS

| | | |
|---|---|---|
| JP | 2006-087451 A | 4/2006 |
| JP | 2009-018137 A | 1/2009 |
| JP | 2010-155074 A | 7/2010 |

\* cited by examiner

*Primary Examiner* — Stephen L. Blau
(74) *Attorney, Agent, or Firm* — Birch, Stewart, Kolasch & Birch, LLP

(57) ABSTRACT

A plurality of golf clubs having mutually different flex point rates of a shaft is prepared. A subject hits a golf ball with one reference club included in the golf clubs. A face angle of the golf club immediately before hitting is measured by an apparatus 10. A recommended flex point rate P is calculated by substituting, into the following mathematical expression, the face angle Q and the flex point rate R of the reference club:

$P=0.8648 \cdot Q+R-5.033$

A golf club having a shaft whose difference between the flex point rate and the recommended flex point rate P is within a predetermined range is selected as a recommended club. The subject hits a golf ball with the recommended club. The apparatus 10 measures a speed, a launch angle, a backspin speed, a sidespin speed, and a deflection angle of the golf ball.

3 Claims, 13 Drawing Sheets

(a)

(b)

US 8,801,547 B2

METHOD FOR SELECTING GOLF CLUB

This application claims priority on Patent Application No. 2010-245881 filed in Japan on Nov. 2, 2010, the entire contents of which are hereby incorporated by reference.

BACKGROUND OF THE INVENTION

1. Field of the Invention

The present invention relates to a method for selecting a golf club. More particularly, it relates to a method for selecting a golf club based on physical properties of a shaft.

2. Description of the Related Art

Physical properties of a shaft of a golf club include a flex point, flex, torque, and weight. The physical properties of a shaft have a great influence on behavior of a golf ball hit with the golf club. The physical properties have an influence on a flight distance of a golf ball. In addition, the physical properties of a shaft also have an influence on a flying direction of a golf ball. A golf player wants a golf club having a shaft which is fitted to the golf player.

Japanese Patent Application Laid-Open No. 2006-87451 describes a method for selecting a golf club. In this method, swings are evaluated based on correspondence between a static characteristic value and a dynamic characteristic value of a golf club.

Japanese Patent Application Laid-Open No. 2009-18137 describes a method for selecting a golf club on the basis of a head speed of a golf club, and an initial speed and a launch angle of a golf ball.

Japanese Patent Application Laid-Open No. 2009-226216 (US 2009/0088275, US 2009/0088276, US 2009/0131189, US 2009/0131193, US 2010/0151956) describes a method for selecting a golf club on the basis of physical features, performance properties and shot properties of a golf player.

With the conventional methods, often, it is not possible to select a golf club fitted to a golf player. An objective of the present invention is to provide a method which enables selection of a golf club fitted to a golf player.

SUMMARY OF THE INVENTION

With a method for selecting a golf club according to the present invention, a golf club fitted to a subject is selected from a plurality of golf clubs that have mutually different physical properties of a shaft. The method includes:
(1) a step of having a subject hit a golf ball with a reference golf club and measuring behavior of the reference club;
(2) a step of determining a recommended range of physical properties of a shaft on the basis of measurement result of the behavior of the reference club;
(3) a step of determining a recommended club with a shaft having the physical properties which fall within the recommended range, from the plurality of golf clubs;
(4) a step of having the subject hit a golf ball with the recommended club, and measuring behavior of the recommended club or behavior of the golf ball; and
(5) a step of judging whether or not the recommended club is fitted to the subject on the basis of the behavior of the recommended club or the behavior of the golf ball.

Preferably, a flex point rate is adopted as physical properties of a shaft. Preferably, as behavior of a reference club, a face angle of a head that the reference club has is adopted. Preferably, determination on a recommended range is made based on a linear expression with the flex point rate and the face angle as variables.

Preferably, as behavior of a golf ball, gap between a flying direction of the golf ball and a target direction is adopted.

Preferably, a flex point of a shaft of a reference golf club is a middle flex point.

DESCRIPTION OF THE PREFERRED EMBODIMENTS

The present invention will be described in detail hereinafter based on preferred embodiments, with reference to the drawings, as appropriate.

Figure 1:
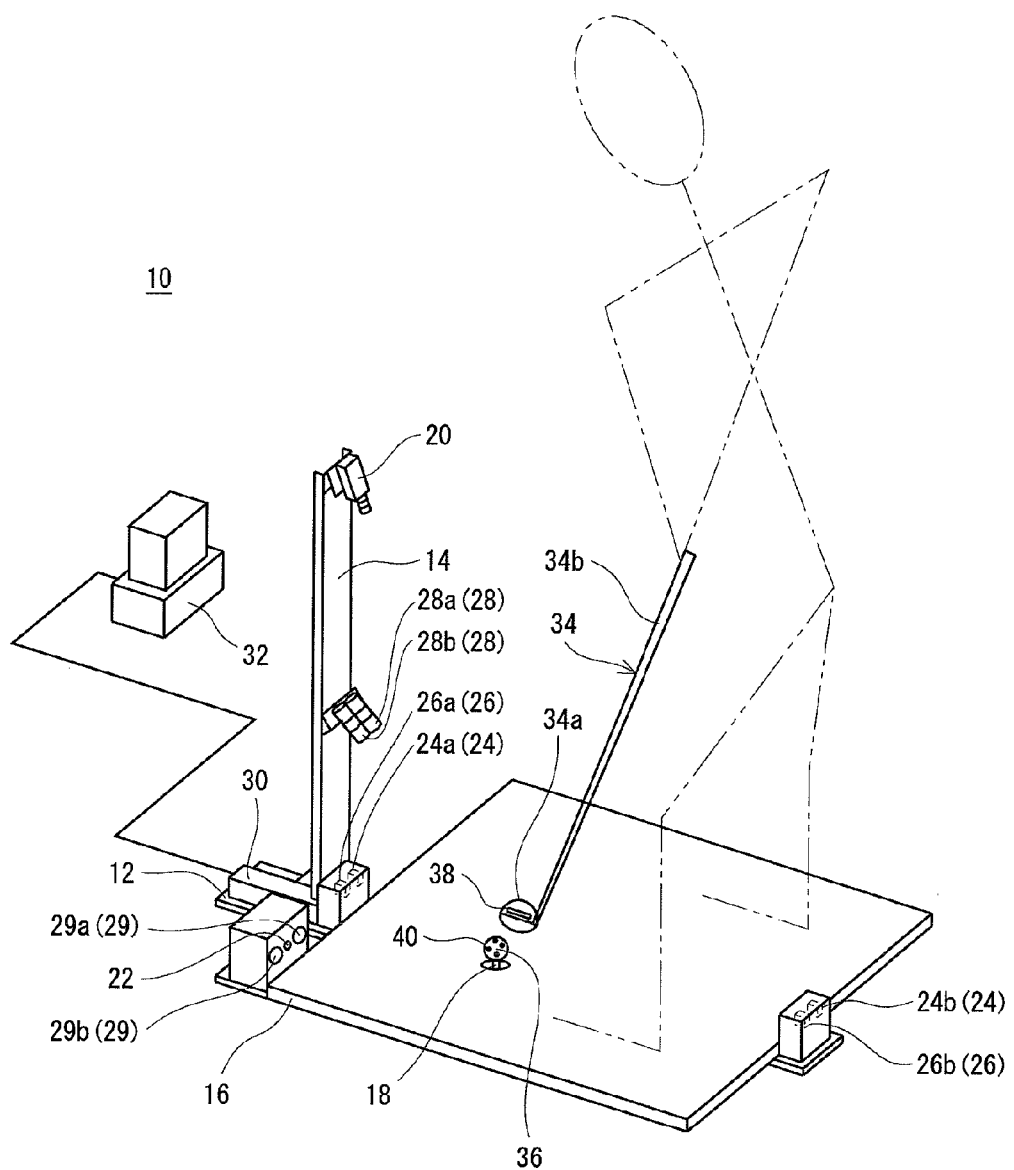
FIG. 1 is an illustration showing a swing analyzer to be used in a method for selecting a golf club according to one embodiment of the present invention.

An analyzer 10 shown in FIG. 1 includes a pedestal 12, a column 14, a floor board 16, a tee 18, a club camera 20, a ball camera 22, a first sensor 24 (24a, 24b), a second sensor 26 (26a, 26b), strobes 28 (28a, 28b), strobes 29 (29a, 29b), a controller 30, and an information processor 32.

In addition to the analyzer 10, FIG. 1 also shows a golf club 34 and a golf ball 36. The golf club 34 includes a head 34a and a shaft 34b. In FIG. 1, a two-dot chain line shows an address posture of a right-handed golf player. The golf ball 36 is hit to a direction which is left to the player in the address posture. Here, for convenience of the description, unless otherwise specified, a description will be given assuming that a right-left direction of a golf player in this address posture shall be a front-back direction, and that the front-back direction of the golf player shall be the right-left direction.

The column 14 and the floor board 16 are positioned on and fixed to the pedestal 12. The column 14 extends upward from the pedestal 12. The tee 18 is positioned on and attached to the floor board 16. The club camera 20 is positioned on and attached to an upper part of the column 14. The ball camera 22 is located more forward than the tee 18, and positioned on and attached to a lateral face of the floor board 16. The club camera 20 and the ball camera 22 are placed to face the golf ball 36 to shoot.

The first sensor 24 includes a light emitting unit 24a and a light receiving unit 24b. The light emitting unit 24a is arranged on one lateral face of the floor board 16, and the light receiving unit 24b is arranged on the other lateral face, with the floor board 16 sandwiched therebetween. The light receiving unit 24b is arranged behind a golf player's feet. The second sensor 26 includes a light emitting unit 26a and a light receiving unit 26b. The light emitting unit 26a is arranged on one lateral face of the floorboard 16, and the light receiving unit 24b is arranged on the other lateral face of the floorboard 16. The light receiving unit 26b is arranged behind a golf player's feet. The first sensor 24 and the second sensor 26 are arranged at positions where the head 34a or the shaft 34b of the golf club 34, which is swung down, traverses between the light emitting unit 24a and the light receiving unit 24b, and between the light emitting unit 26a and the light receiving unit 26b.

The strobes 28 (28a, 28b) are attached to a center part of the column 14 in a vertical direction. The strobes 28 are arranged beneath the club camera 20. The controller 30 is attached to the pedestal 12.

Figure 2:
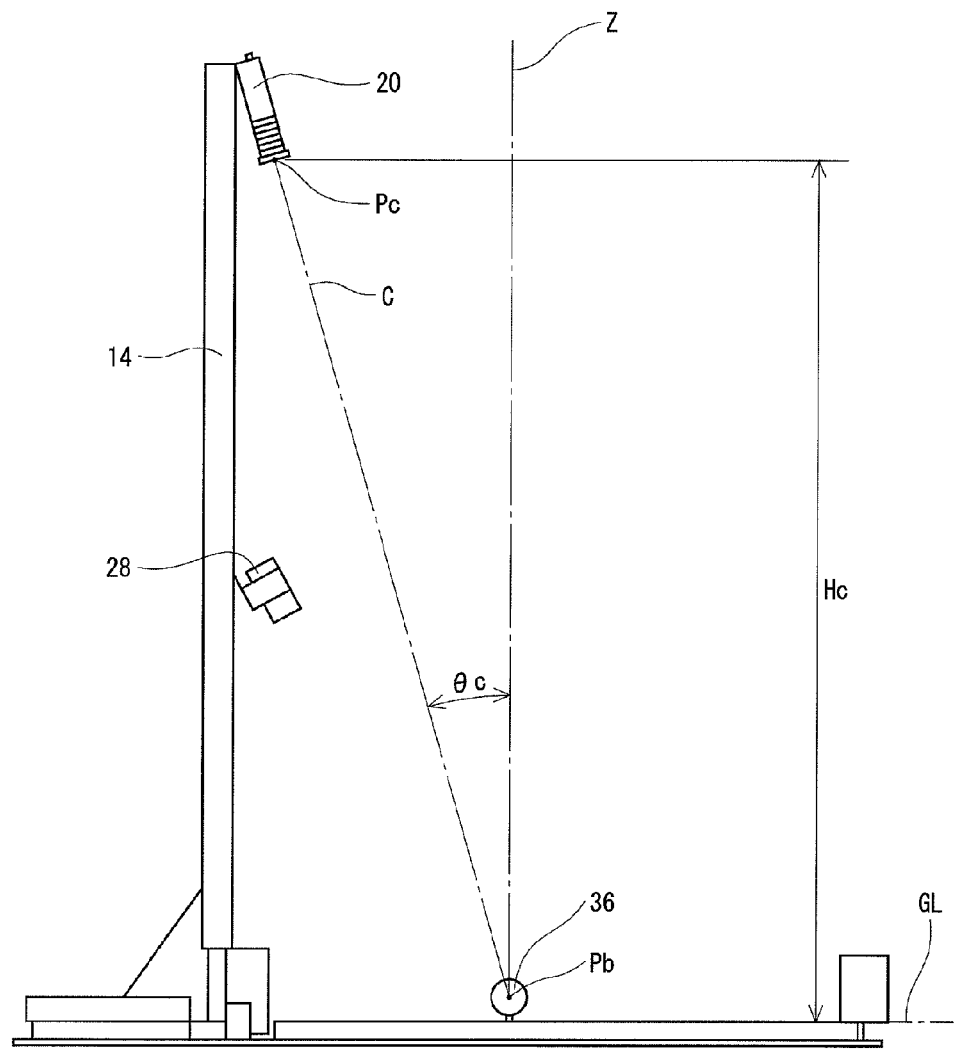
FIG. 2 is a front view of the analyzer of FIG. 1.

A point Pb shown in FIG. 2 shows a center point of the golf ball 36. A point Pc shows a center point of a lens of the club camera 20. A straight line GL shows a ground level on which a golf player stands. A one-dot chain line Z shows a normal passing through the center point Pb in a perpendicular direction. A one-dot chain line C shows a straight line passing through the center point Pb and the center point Pc. An angle θc shows an intersection angle of the normal Z and the straight line C. A double-headed arrow Hc shows height from the ground level to the center point Pc. In the embodiment, height Hc is 1.1 m and the angle θc is 15°.

The controller 30 is connected to the club camera 20, the ball camera 22, the first sensor 24, the second sensor 26, the strobes 28, the strobes 29, and the information processor 32, although it is not shown. The controller 30 can transmit a shooting start signal to the club camera 20 and the ball camera 22. The controller 30 can receive a signal of a shot image from the club camera 20 and the ball camera 22. The controller 30 can receive a detection signal of the head 34a or the shaft 34b from the sensors 24 and 26. The controller 30 can transmit a light emission start signal to the strobes 28 and 29.

The information processor 32 includes a monitor as an output unit, an interface board as a data input unit, a memory, a CPU, and a hard disk, although they are not shown. The information processor 32 may include a keyboard and a mouse. As the information processor 32, a general-purpose computer may be used directly.

The hard disk stores a program. The memory is rewritable, and constitutes a storage area or a working area for programs or various types of data called from the hard disk. The CPU can read a program stored in the hard disk. The CPU can run the program in the working area of the memory. The CPU can execute various processes according to the program.

Into the interface board, club image data, ball image data, and synchronous data with the two pieces of image data can be input. The input data is output to the CPU. The CPU performs various processes, and outputs to the monitor predetermined data of a club behavior value, a ball behavior value, and a value calculated from the above values. In addition, it stores the predetermined data in the hard disk.

Figure 3:
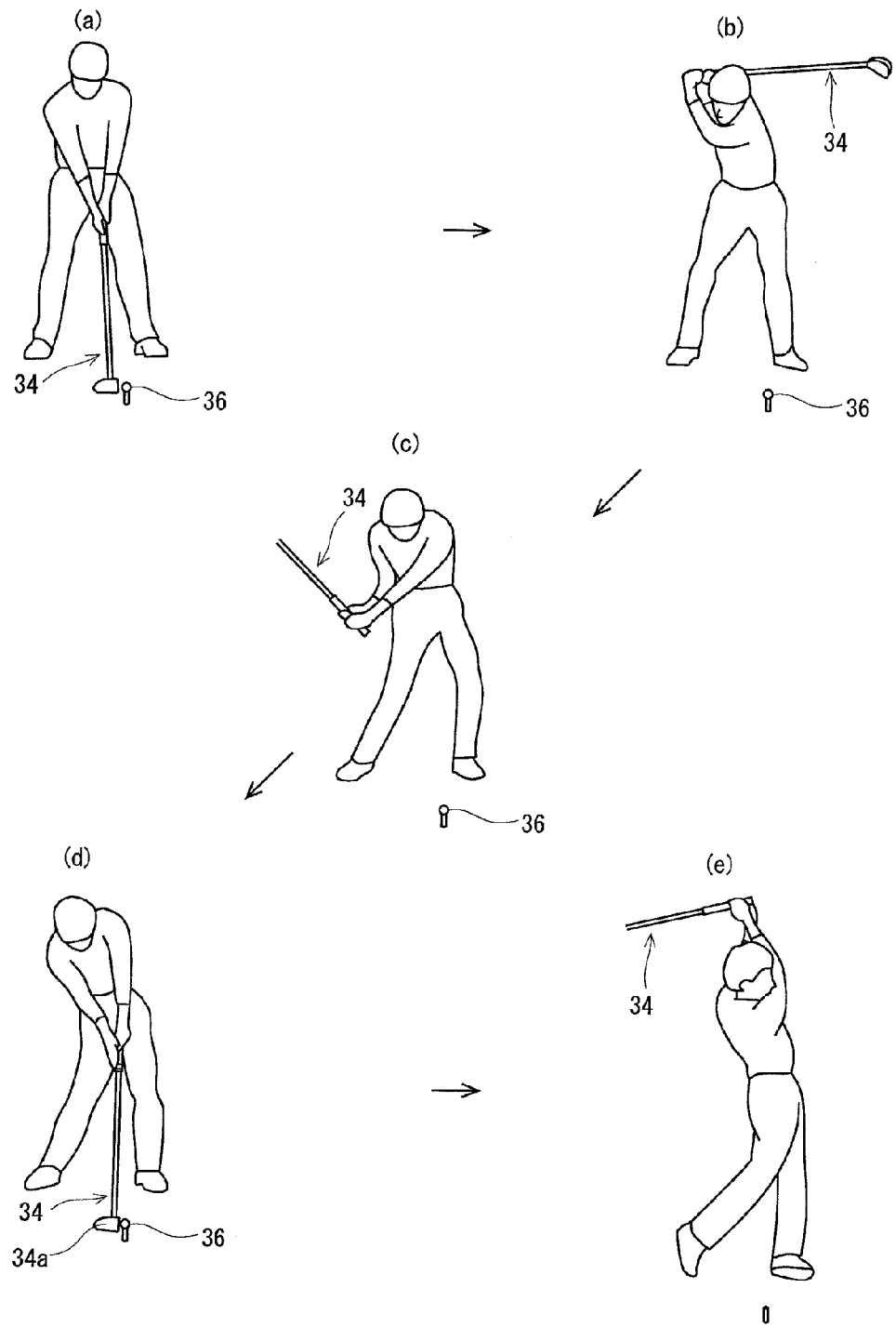
FIG. 3 is an illustration for swing positions.

FIG. 3 shows each position at which a golf player swings with the golf club 34. FIG. 3(a) shows an address position. FIG. 3(b) shows a top of swing position (hereinafter referred to as the top). FIG. 3(d) shows an impact position, which is a position at the moment when the head 34a collides with the golf ball 36. FIG. 3(c) shows a position of downswing through which the golf player shifts from the top to the impact. FIG. 3(e) shows a finish position. A player's swing sequentially shifts from the address to the top, from the top to the impact through the downswing, and from the impact to the finish. The swing ends at the finish.

A usage example of the swing analyzer 10 will be described hereinafter. In the usage example, tape 38 is put as a mark on the head 34a of the golf club 34. The tape 38 is long. A longitudinal direction of the tape 38 is put in parallel to a face surface of the golf club 34. A plurality of points 40 are also attached as a mark on the golf ball 36. The golf ball 36 is set on the tee 18. The golf player is at address with the golf club 34.

The golf player starts to swing with the golf club 34. In the process from the downswing to the impact, the first sensor 24 detects the golf club 34. A detection signal of the first sensor 24 is output to the controller 30. At time T1 after receiving the detection signal, the controller 30 outputs a light emission start signal to the strobe 28a. Upon receipt of this signal, the strobe 28a emits light. At time T2 after receiving the detection signal, the controller 30 outputs a shooting start signal to the club camera 20. The time T2 is greater than the time T1.

Next, the second sensor 26 detects the golf club 34. A detection signal of the sensor 26 is output to the controller 30. At time T3 after receiving the detection signal, the controller 30 outputs a light emission start signal to the strobe 28b. Upon receipt of this signal, the strobe 28b emits light. At time T4 after receiving the detection signal, the controller 30 outputs a shooting start signal to the club camera 20. The time T4 is greater than the time T3.

The club camera 20 shoots behavior of the golf club 34. A period from the time T1 to T4 is very short, and is from hundreds of microseconds to thousands of microseconds. The club camera 20 includes a multishutter. The club camera 20 is made to be able to continuously shoot at a high speed at predetermined intervals in one shooting range. The continuous shooting enables more than two multiple image signals to be obtained. In the example, a first club image signal resulting from a shooting start signal of the first sensor and a second club image signal resulting from a shooting start signal of the second sensor can be obtained. The image signals are output to the controller 30. The controller 30 converts the first club image signal into first club image data, and the second club image signal into second club image data.

In the analyzer 10, based on detection time of the first sensor 24 and the second sensor 26, time data at shooting time on one time axis is added to the first club image data. For example, the time T2 is given to the first club image data. The time T4 is given to the second club image data. The time T4 is greater than the time T2.

In the analyzer 10, a distance D1 between a detection position of the first sensor 24 and that of the second sensor 26 is predefined. Speed Vh of the head 34a is calculated from the detection time of the first sensor 24, that of the second sensor 26, and the distance D1. The controller 30 determines time T5, T6, T7, and T8 from the speed Vh, the detection position of the first sensor 24 or that of the second sensor 26, and a position of the golf ball 36.

The controller 30 outputs a light emission signal to the strobe 29a at the time T5. The controller 30 outputs a shooting start signal to the ball camera 22 at the time T6. The controller 30 outputs a light emission signal to the strobe 29b at the time T7, and a shooting start signal to the ball camera 22 at the time T8. A period from the time T5 to T8 is also very short and is from hundreds of microseconds to thousands of microseconds.

The ball camera 22 shoots behavior of the golf ball 36. The ball camera 22 includes a multishutter. The ball camera 22 can continuously shoot at a high speed at predetermined time intervals. The continuous shooting enables a plurality of instantaneous image signals to be obtained. In the example, a first ball image signal and a second ball image signal can be obtained. The image signals are output to the controller 30. The controller 30 converts the image signals into first ball image data and second ball image data, respectively.

The time T6 is given to the first ball image data. The time T8 is given to the second ball image data. In this manner, time data of the shooting time on the one time axis is given to the image data. The time axis for the time data of the ball image data and that for the time data of the above-mentioned club image data are identical, and the ball image data and the club image data are synchronized.

The controller 30 outputs the time data, the club image data, and the ball image data to the information processor 32.

The information processor 32 calculates a predetermined behavior value of the club from the club image data. Here, a value of a face angle is calculated.

Figure 4:
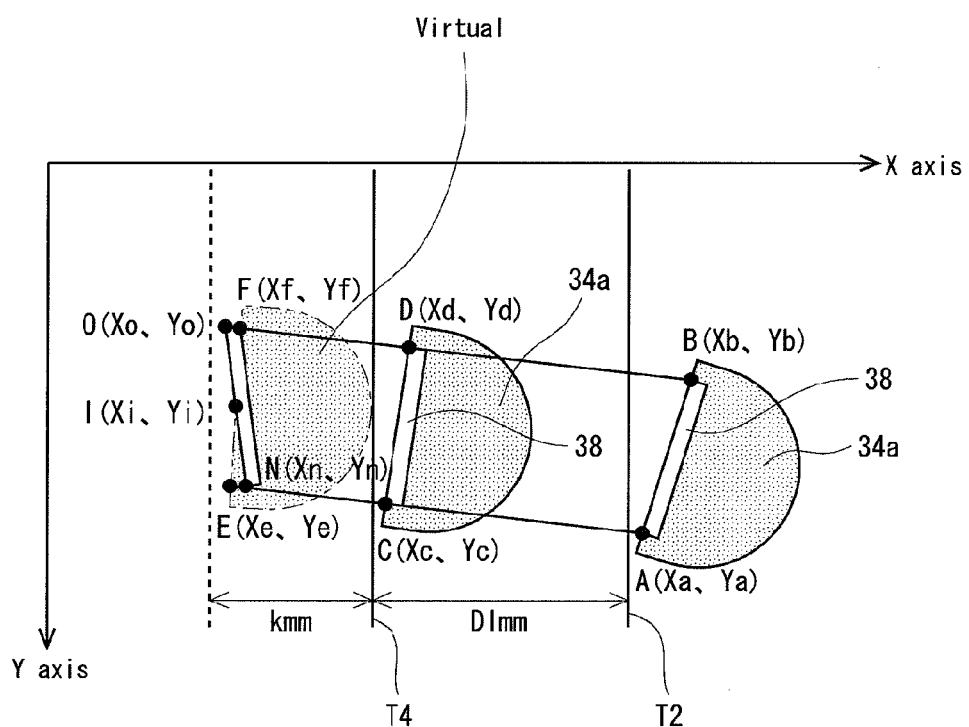
FIG. 4 is an illustration showing a method for measuring a face angle by the analyzer of FIG. 1.

A method for calculating a face angle from the club image data will be exemplified hereinafter, with reference to FIG. 4. In FIG. 4, X axis is a front-back direction (right-left direction of a golf player) and is a target direction of the golf ball 36. Y axis is a right-left direction (front-back direction of a golf player) and is an axis which is orthogonal to the X axis on a horizontal plane. A point A (Xa, Ya) shows a position of one end of the tape 38. A point B (Xb, Yb) shows a position of the other end of the tape 38. The point A (Xa, Ya) and the point B (Xb, Yb) are calculated from the club image data of the time T2.

The face angle θr1 is calculated from the point A (Xa, Xb) and the point B (Xb, Yb), with the following mathematical expression:

$$\theta r1 = \arctan((Xb-Xa)/(Ya-Yb)) \cdot 180/\pi$$

The calculated face angle θr1 is calculated based on data of an image shot by the club camera 20 which shoots obliquely from above. A corrected face angle θm1 is calculated based on the calculated face angle θr1, with the following mathematical expression:

$$\theta m1 = A \cdot \theta r1 + B$$

In the above mathematical expression, the "A" is a correction coefficient based on a position of the club camera 20, and the "B" is a correction segment based on the position of the club camera 20. The coefficient A and the segment B are calculated in advance from a gap between an actually measured face angle of the head 34a and the calculated face angle determined by the club camera 20, and given to the information processor 32. For example, the coefficient A and the segment B are calculated from an actually measured face angle and a calculated face angle of a position detected by the first sensor 24 and a position detected by the second sensor 26.

A point C (Xc, Yc) of FIG. 4 shows a position of a point on one end of the tape 38 at the time T4. Similarly, a point D (Xd, Yd) shows a position of a point on the other end of the tape 38 at the time T4. Similar to the corrected face angle θm1 of the time T2, a corrected face angle θm2 of the time T4 is determined with the following mathematical expressions:

$$\theta r2 = \arctan((Xd-Xc)/(Yc-Yd)) \cdot 180/\pi$$

$$\theta m2 = A \cdot \theta r2 + B$$

Next, a virtual position of the head 34a at a position where the head 34a of the golf club 34 comes into contact with the golf ball 36 (a position at time immediately before hitting) is calculated. A position E (Xe, Ye) shows a position of a primary virtual position on one end of the tape 38 at the time immediately before hitting. Similarly, a point F (Xf, Yf) shows a position of a primary virtual position on the other end of the tape 38 at the time immediately before hitting.

As shown in FIG. 4, here, a distance between a detection position of the first sensor 24 and that of the second sensor 26 is D1 mm. A distance between the detection point of the second sensor 26 and a position at the time immediately before hitting is k mm. The point E (Xe, Ye) and the point F (Xf, Yf) are calculated with the following mathematical expressions:

$$Xe = Xc + (Xc-Xa) \cdot k/D1, Ye = Yc + (Yc-Ya) \cdot k/D1$$

$$Xf = Xd + (Xd-Xb) \cdot k/D1, Yf = Yd + (Yd-Yb) \cdot k/D1$$

A point I (Xi, Yi) in FIG. 4 shows a midpoint of the point E (Xe, Ye) and the point F (Xf, Yf). The midpoint I (Xi, Yi) is determined from the point E (Xe, Ye) and the point F (Xf, Yf) at the primary virtual positions, with the following mathematical expression:

$$Xi = (Xe+Xf)/2, Yi = (Ye+Yf)/2$$

A point N (Xn, Yn) and a point O (Xo, Yo) in FIG. 4 show secondary virtual positions. The secondary virtual positions result from rotation correction, on a XY plane, of the head 34a which is at the primary virtual position. In the rotation correction, the amount of rotation of the head 34a between the detection position of the second sensor 26 and the primary virtual positions is considered. A value a of the rotation correction is calculated based on the point A (Xa, Ya) and the point B (Xb, Yb), and the point C (Xc, Yc) and the point D (Xd, Yd).

The point N (Xn, Yn) and the point (Xo, Yo) are calculated with the following mathematical expressions:

$$Xe' = Xe-Xi, Ye' = Ye-Yi$$

$$Xf' = Xf-Xi, Yf' = Yf-Yi$$

$$Xn' = Xe' \cdot \cos(\alpha) - Ye' \cdot \sin(\alpha)$$

$$Yn' = Xe' \cdot \sin(\alpha) + Ye' \cdot \cos(\alpha)$$

$$Xo' = Xf' \cdot \cox(\alpha) - Yf' \cdot \sin(\alpha)$$

$$Yo' = Xf' \cdot \sin(\alpha) + Yf' \cdot \cos(\alpha)$$

$$Xn = Xn' + Xi, Yn = Yn' + Yi$$

$$Xo = Xo' + Xi, Yo = Yo' + Yi$$

A calculated face angle θr3 and a corrected face angle θm3 at the position immediately before hitting are calculated from the point N (Xn, Yn) and the point O (Xo, Yo) at the secondary virtual positions, with the following mathematical expressions:

$$\theta r3 = \arctan((Xo-Xn)/(Yn-Yo)) \cdot 180/\pi$$

$$\theta m3 = A \cdot \theta r3 + B$$

The information processor 32 calculates a predetermined behavior value of a ball from ball image data. Here, values of a ball speed, a launch angle, a deflection angle, backspin speed, and sidespin speed, for example, are calculated. These values are calculated based on the ball image data obtained from the ball camera 22. For example, they are calculated from first ball image data at the time T6 and second ball image data at the time T8.

The ball speed is calculated from a position of the golf ball 36 which is determined from the ball image data of 2 positions, and the shooting time.

The launch angle represents an angle of a direction to which the golf ball 36 is hit with respect to a horizontal direction. The deflection angle represents an angle of a direction to which the golf ball 36 is hit on an XY plane with respect to an X axis direction. For example, a distance to the ball camera 22 is determined based on the ball size which is determined from the ball image data of the 2 positions, and the deflection angle is determined based on the distance.

The backspin speed is a rotation rate of the golf ball 36 in the front-back direction. The sidespin speed is a rotation rate of the golf ball 36 in the right-left direction. The backspin speed and the sidespin speed are determined from the ball image data of the 2 positions mentioned above. Alternatively, a spin speed may be determined from ball image data of 3 positions by adding another position.

A plurality of points 40 are attached to a surface of the golf ball 36. The backspin speed and the sidespin speed can be measured with accuracy on the basis of a travel distance of 2 points of the points 40. The spin speed is calculated from the position of the golf ball 36 and time intervals of shooting.

The calculated club behavior value and the ball behavior value are stored in the information processor 32, with the time data. The information processor 32 displays predetermined behavior values obtained from the club behavior value and the ball behavior value, on a monitor.

The analyzer 10 stores the ball behavior value, corresponding to the club behavior value. If values of the ball speed, the launch angle, the deflection angle, the backspin speed, and the sidespin speed are identified, a flight distance and a flying direction of the golf ball 36 can be calculated. In the analyzer 10, the flight distance and the flying direction of the golf ball 36 which correspond to the club behavior values such as the face angle, a head trajectory angle, right and left hitting points or the like can be calculated.

The club camera 20 performs continuous shooting by a high-speed shutter. In a shooting range of the club camera 20, at least first club image data at time T2 and second club image data at time T4 which have been continuously shot are obtained. As two pieces of the club image data can be obtained in one shooting range, a positional relation of the moving golf club 34 can be measured with accuracy. When the club image data shot with two different cameras is used, an error in arrangement setting of the two cameras affects a calculation error in the club behavior value. In this analyzer 10, when the club camera 20 is arranged, no relative positional accuracy with other cameras is requested. In addition, depending on the club camera 20, third club image data, fourth club image data or the like which are continuously shot may be further used.

Similar to the club camera 20, the ball camera 22 also performs continuous shooting by a high-speed shutter. The continuous shooting enables first ball image data and second ball image data to be obtained. In one shooting range, two pieces of ball image data can be obtained. Installation of the ball camera 22 is easy. Installation of the analyzer 10 is easy. In addition, third ball image data, fourth ball image data or the like which are continuously shot may be used.

In the method for selecting a golf club according to the present invention, a plurality of shafts is prepared. These shafts have a mutually different flex point rate. The flex point rate K is calculated with the following mathematical expression:

$$K = (F2/(F1+F2)) \cdot 100$$

where F1 represents forward flex (mm) and F2 represents backward flex.

Figure 5:
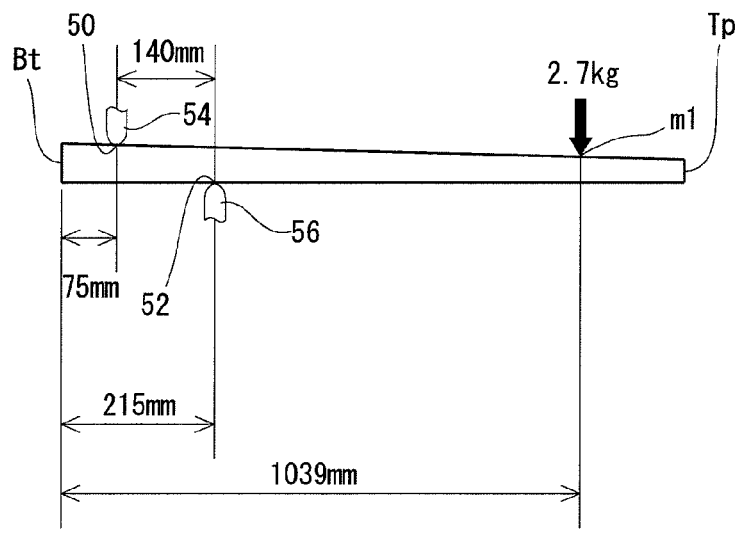
FIG. 5 is an illustration for measuring flex of a shaft.
Figure 5:
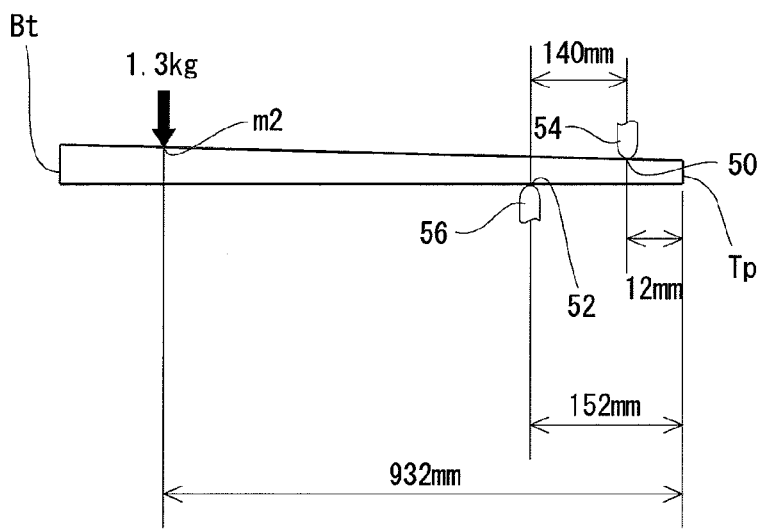

FIG. 5(a) shows a method for measuring forward flex F1. In this method, a first supporting point 50 is set at a position which is 75 mm from the shaft back end Bt. Furthermore, a second supporting point 52 is set at a position which is 215 mm from the shaft back end Bt. A supporting body 54 which supports the shaft from above is made to abut the first supporting point 50. A supporting body 56 which supports the shaft from underneath is made to abut the second supporting point 52. In an unloaded state, a shaft axial line of the shaft 20 is almost horizontal. A load of 2.7 kg is caused to act perpendicularly downward on a load point m1 which is 1039 mm from the shaft back end Bt. A travel distance (mm) of the load point m1 from the unloaded state to a loaded state is the forward flex F1. The travel distance is along a perpendicular direction.

Cross sectional shapes of parts of the supporting body 54 which abut the shaft are as follows. In a cross section parallel to a shaft axial direction, a cross sectional shape of the abutting part of the supporting body 54 has convex roundness. A curvature radius of the roundness is 15 mm. In a cross section vertical to the shaft axial direction, a cross sectional shape of the abutting part of the supporting member 54 has concave roundness. A curvature radius of the concave roundness is 40 mm. In the cross section vertical to the shaft axial direction, horizontal length (length in a depth direction in FIG. 5) of the abutting part of the supporting body 54 is 15 mm. A cross sectional shape of the abutting part of the supporting body 56 is identical to that of the supporting body 54. A cross sectional shape of an abutting part of a loading indenter (not shown) which gives a load of 2.7 kg to the load point m1 has convex roundness on a cross section parallel to the shaft axial direction. A curvature radius of the roundness is 10 mm. A cross sectional shape of an abutting part of a loading indenter (not shown) which gives a load of 2.7 kg at the load point m1 is a straight line on a cross section vertical to the shaft axial line. Length of the straight line is 18 mm.

FIG. 5(b) shows a method for measuring backward flex F1. In this method, a first supporting point 50 is a point which is 12 mm spaced from a shaft tip Tp, and a second supporting point 52 is a point which is 152 mm spaced from the shaft tip Tp, and a load point m2 is a point which is 932 mm spaced from the shaft tip Tp. Except that a load is 1.3 kg, the backward flex F2 is measured similarly to the forward flex F1.

In general, a shaft whose flex point rate is less than 45% is a shaft with a high flex point, a shaft whose flex point rate is 45% or more and less than 47% is a shaft with a middle flex point, and a shaft whose flex point rate is 47% or more is a shaft with a low flex point. In the method for selecting a golf club according to the present invention, preferably, a shaft with a high flex point, a shaft with a middle flex point, and a shaft with a low flex point are prepared.

Figure 6:
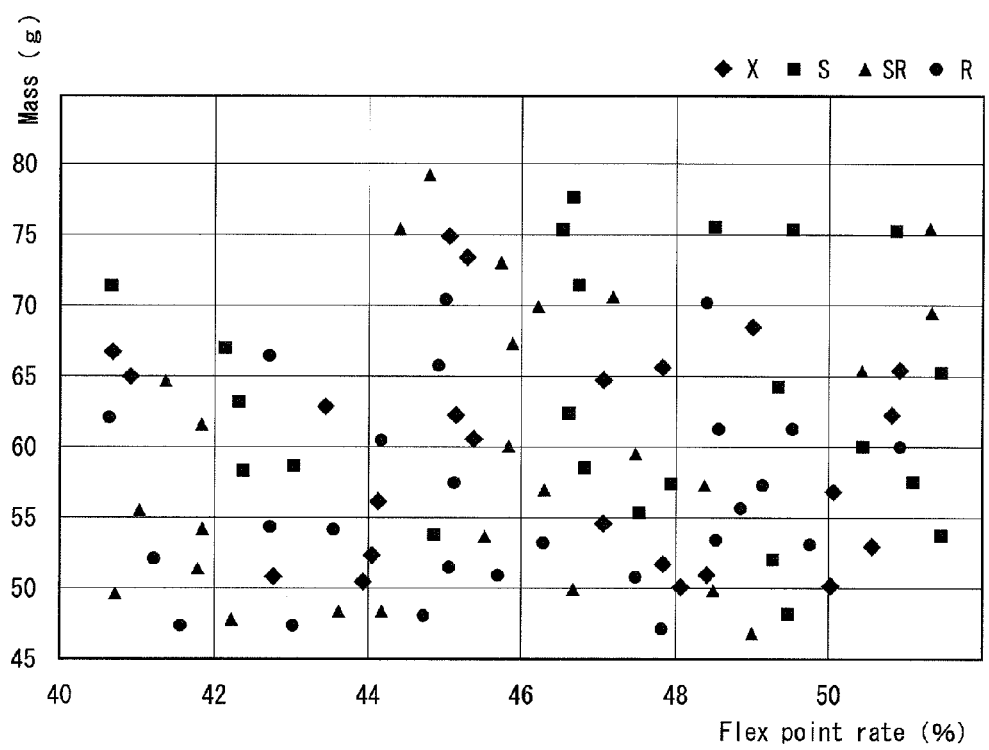
FIG. 6 is a matrix showing a flex point rate, flex and mass of the shaft.

Preferably, in the method for selecting a golf club, a plurality of shafts which have mutually different flex is prepared. For example, a shaft whose flex is X, a shaft whose flex is S, a shaft whose flex is SR, and a shaft whose flex is R are prepared. In addition, a plurality of shafts whose mass is mutually different may be prepared. FIG. 6 shows one example of a matrix of golf clubs to be prepared. The flex point rate, flex, and mass of these shafts are stored in the hard disk of the information processor 32.

A golf club is obtained by attaching a head to the shafts. The shaft may be attached to the head by an adhesive. The shaft may be removably attached to the head by a bolt or the like. In all golf clubs, specifications of the head are standardized.

Figure 7:
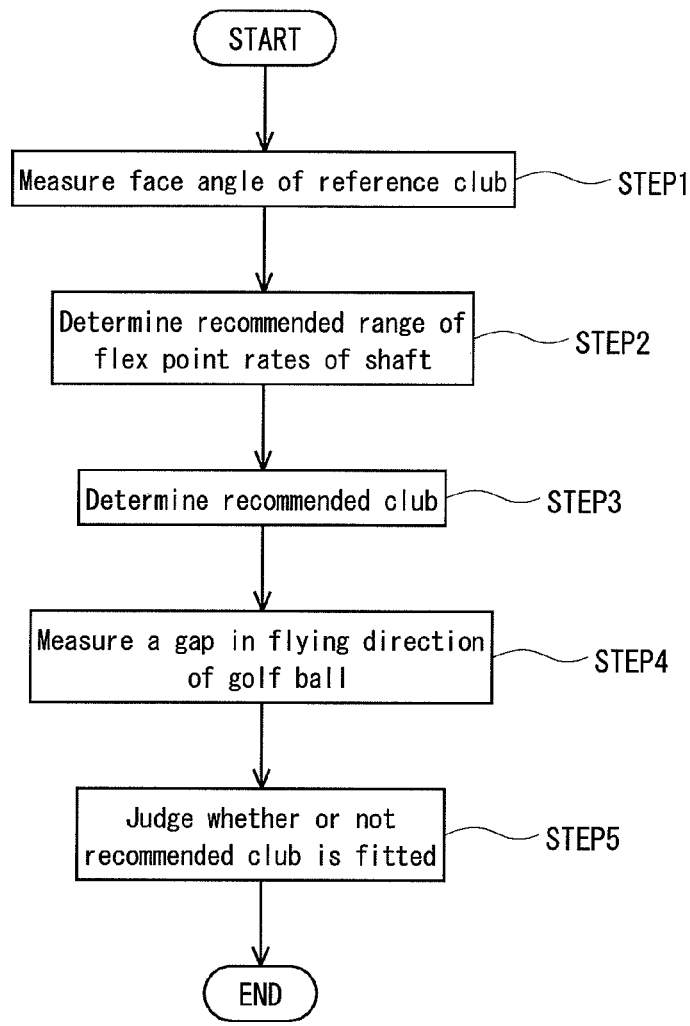
FIG. 7 is a flow chart showing a method for selecting a golf club with the apparatus shown in FIG. 1 and FIG. 2.

FIG. 7 is a flow chart showing a method for selecting a golf club with the apparatus shown in FIG. 1 and FIG. 2. The method for selecting a golf club includes a step of measuring a face angle of a reference club (STEP 1), a step of determining a recommended range of flex point rates of a shaft (STEP 2), a step of determining a recommended club including a shaft having physical properties which fall into the recommended range (STEP 3), a step of measuring a gap of a flying direction of a golf ball (STEP 4), and a step of judging whether or not the recommended club is fitted (STEP 5). Each step will be described in detail hereinafter.

Figure 8:
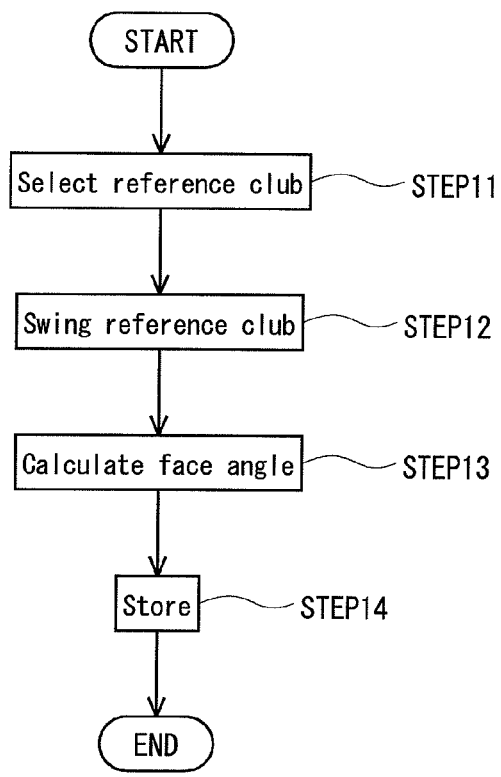
FIG. 8 is a flow chart showing a method for measuring a face angle of a reference club.

In the step of measuring a face angle of a reference club (STEP 1), a reference club is selected as shown in FIG. 8 (STEP 11). Preferably, a golf club having a shaft with a middle flex point is selected as a reference club. More preferably, a golf club having a shaft with a flex point rate of about 46 is selected as a reference club. The flex of the reference club is determined by considering a body type, muscular strength, history of exercise, taste, or the like of a subject (golf player).

The subject swings the reference club (STEP 12). With this swing, the golf ball is hit. The information processor 32 calculates a face angle (degree) immediately before hitting, with the method described above (STEP 13). Preferably, the subject repeats swings several times and multiple pieces of data on the face angle are obtained. The data is stored in the hard disk of the information processor 32. The CPU calculates an average value of the face angle. The average value is also stored in the hard disk (STEP 14).

Figure 9:
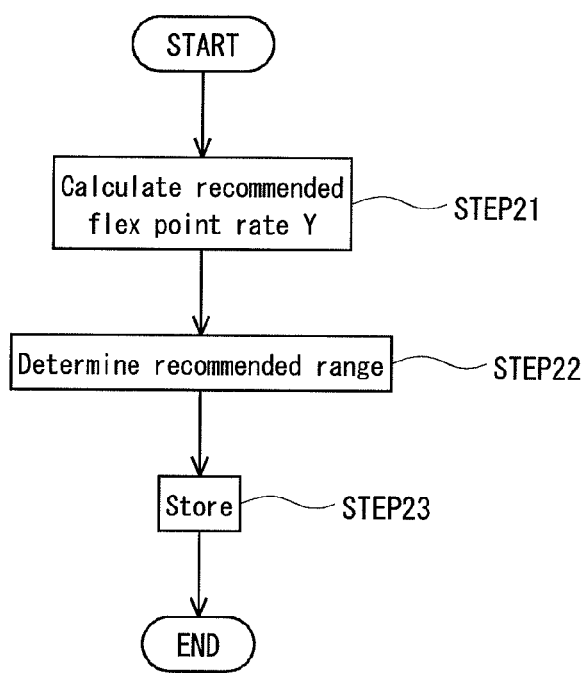
FIG. 9 is a flow chart showing a method for determining a recommended range of a flex point rate of a shaft.
Figure 10:
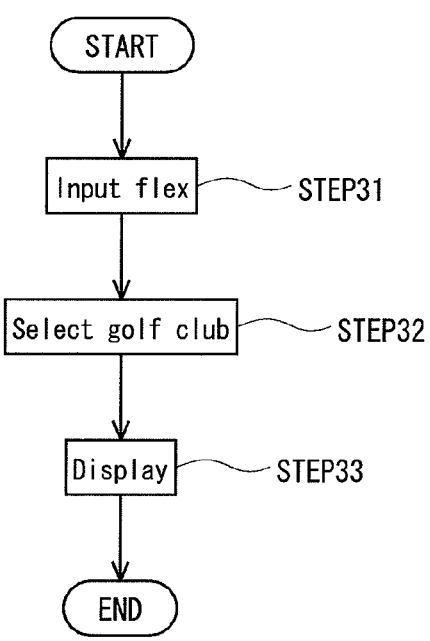
FIG. 10 is a flow chart showing a method for determining a recommended club.

In the step of determining a recommended range of flex points of a shaft (STEP 2), the CPU calculates a recommended flex rate point P, as shown in FIG. 9. The calculation is performed based on the linear expression shown below:

$$P = 0.8648 \cdot Q + R - 5.033$$

In this mathematical expression, "Q" represents a face angle (mean value), and "R" represents a flex point rate of the reference club. The mathematical expression has been determined statistically by the inventor. The recommended flex point rate P may be calculated with other mathematical expressions.

Based on the recommended flex point rate P, the CPU determines the recommended range of flex point rates (STEP 22). A lower limit value of the recommended range is a value obtained by subtracting a predetermined value from the recommended flex point rate P. For example, a value obtained by subtracting 1.0% from the recommended flex point rate is a lower limit value. An upper limit value of the recommended range is a value obtained by adding a predetermined value to the recommended flex point rate P. For example, a value obtained by adding 1.0% to the recommended flex point rate P is an upper limit value. The lower and upper limit values are stored in the hard disk (STEP 23).

In a step of determining a reference club (STEP 3), flex fitted to the subject is input into the information processor 32 (STEP 31). Flex to be input may be one or more than two. The CPU selects a golf club which satisfies the following conditions (1) and (2) from all golf clubs (STEP 32):

(1) The shaft has flex which is input in STEP 31.
(2) The flex point rate of the shaft falls within the recommended range.

The following condition may be added.
(3) A mass difference between a shaft of a club and that of the reference club falls within a predetermined range.

Figure 11:
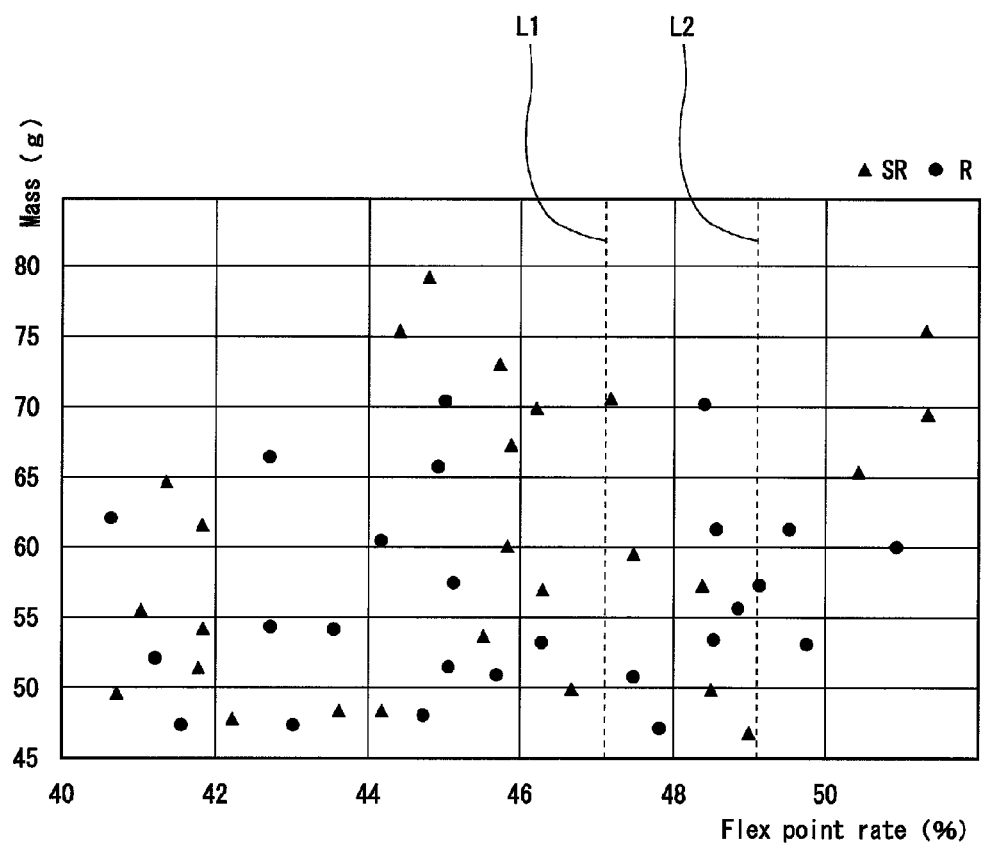
FIG. 11 is a matrix showing a flex point rate, flex, and mass of a shaft, together with a line representing a recommended range.

The CPU displays the selected golf club on a display (STEP 33). FIG. 11 shows one example of a screen to be displayed. FIG. 11 shows the screen of a case in which the flex is SR or R, the recommended flex point rate is 48.1%, the lower limit value of the recommended range is 47.1%, and the upper limit value of the recommended range is 49.1%. The golf clubs having the shaft which falls within the area sandwiched by a line L1 representing the lower limit value and a line L2 representing the upper limit value are recommended golf clubs. In this example, the number of the recommended club is 11.

Figure 12:
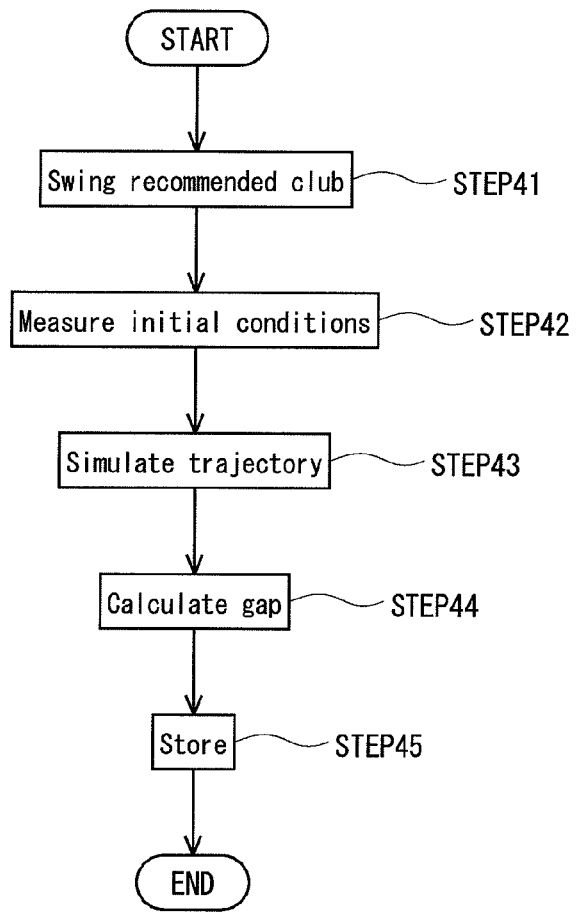
FIG. 12 is a flow chart showing a method for measuring a gap in a flying direction of a golf ball.
Figure 13:
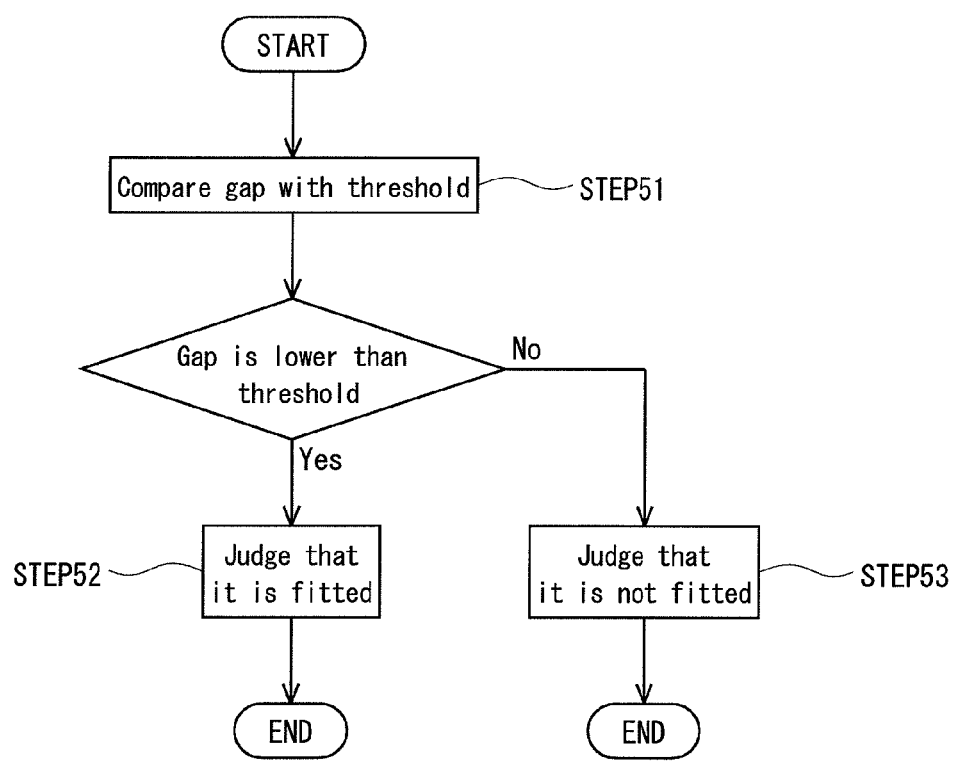
FIG. 13 is a flow chart showing a method for judging whether or not the recommended club is fitted.

In a step of measuring a gap in a flying direction of a golf ball (STEP 4), the subject swings the recommended club, as shown in FIG. 12 (STEP 41). With the swing, the golf ball is hit. The information processor 32 measures so-called initial conditions such as a speed, a launch angle, a backspin speed, a sidespin speed, and a deflection angle or the like of the golf ball (STEP 42). Using the initial conditions, the CPU simulates trajectory of the golf ball with a trajectory equation (STEP 43). With the simulation, a flight distance of the golf ball is calculated. With the simulation, a gap in a flying direction of the golf ball is further calculated (STEP 44). A "gap" is a distance between a spot where the golf ball drops or gets still and a target line. It is preferable that procedure from swinging (STEP 41) to the calculation of the gap (STEP 44) are repeated, and an average value of the gap is calculated. Data on the gap (average value) is stored in the hard disk (STEP 45).

In a step of judging whether or not the recommended club is fitted (STEP 5), the gap (average value) obtained from the simulation (STEP 43) is compared with a threshold (STEP 51). The comparison may be performed by the CPU or a human being. When the gap is equal to or lower than the threshold, it is judged that this recommended club is fitted to the subject (STEP 52). When the gap is higher than the threshold, it is judged that this recommended golf club is not fitted to the subject (STEP 53). If more than one recommended club exist, the judgment (STEP 5) will be made more than once. In this manner, a golf angle fitted to the subject is determined.

In the embodiment, the face angle is adopted as behavior of the reference club. Instead of or in addition to the face club, other behavior may be adopted. Other behavior include trajectory of the head and a hit point.

In the embodiment, as physical properties of the shaft, the flex point rate is selected. Instead of or in addition to the flex point rate, other physical properties may be adopted. Other physical properties include flex, length, and mass.

In the embodiment, a judgment on whether or not a recommended club is fitted to a subject is made based on behavior of a golf ball (specifically, a gap). Instead of or in addition to the gap, other behavior of the golf ball may be adopted. Other behavior includes a speed, a launch angle, a deflection angle, a backspin speed, a sidespin speed, trajectory height, a flight distance, and flight duration. Instead of or in addition to the behavior of the golf ball, behavior of the golf club may be adopted.

The method described above is suitable for selection of a wood-type club, selection of an iron-type club, and a hybrid-type club. The above description is just an example, and various changes can be made without departing from the scope of the present invention.

What is claimed is:

1. A method for selecting a golf club fitted to a subject from a plurality of golf clubs having mutually different physical properties of a shaft, the method for selecting a golf club including:

a step of having a subject hit a golf ball with a reference golf club and measuring behavior of the reference club;

a step of determining a recommended range of physical properties of the shaft on the basis of measurement result of the behavior of the reference club;

a step of determining a recommended club with a shaft having the physical properties which fall within the recommended range, from the plurality of golf clubs;

a step of having the subject hit a golf ball with the recommended club, and measuring behavior of the recommended club or behavior of the golf ball; and a step of judging whether or not the recommended club is fitted to the subject based on the behavior of the recommended club or the behavior of the golf ball, wherein the physical property of the shaft is a flex point rate, and behavior of the reference club is a face angle of a head the reference club has, and wherein determination of the recommended range is made based on a linear expression with the flex point rate and the face angle as variables.

2. The method for selecting a golf club according to claim 1 wherein behavior of the golf ball is a gap between a flying direction of the golf ball and a target direction.

3. The method for selecting a golf club according to claim 1 wherein a flex point of the shaft of the reference club is a middle flex point.

* * * * *